United States Patent [19]

Tangemann et al.

[11] Patent Number: 5,732,075
[45] Date of Patent: Mar. 24, 1998

[54] ASSIGNMENT OF A CARRIER FREQUENCY IN AN SDMA RADIO SYSTEM

[75] Inventors: Michael Tangemann, Leonberg; Cornelis Hoek, Tamm; Heinz Schlesinger, Mundelsheim, all of Germany

[73] Assignee: Alcatel N.V., Rijswijk, Netherlands

[21] Appl. No.: 599,460

[22] Filed: Jan. 22, 1996

[30] Foreign Application Priority Data

Feb. 24, 1995 [DE] Germany ................. 195 06 439.9

[51] Int. Cl.$^6$ ................................................. H04B 7/208
[52] U.S. Cl. .................. 370/343; 370/342; 370/347; 342/367; 455/54.1
[58] Field of Search ............................ 342/350, 359, 342/367; 455/25, 34.1, 50.1, 54.1; 370/319, 329, 341, 342, 343, 344, 347

[56] References Cited

U.S. PATENT DOCUMENTS

| | | | |
|---|---|---|---|
| 4,425,639 | 1/1984 | Acampora et al. | 455/25 |
| 4,813,036 | 3/1989 | Whitehead | 370/343 |
| 4,965,732 | 10/1990 | Roy, III et al. | 364/460 |
| 5,553,069 | 9/1996 | Ueno et al. | 455/25 |
| 5,559,806 | 9/1996 | Kurby et al. | 370/343 |

FOREIGN PATENT DOCUMENTS

| | | |
|---|---|---|
| 0586090 | 3/1994 | European Pat. Off. |
| 3118018 | 11/1982 | Germany . |
| 3423289 | 1/1986 | Germany . |
| 4134357 | 4/1993 | Germany . |
| 9312590 | 6/1993 | WIPO . |
| 9323935 | 11/1993 | WIPO . |

OTHER PUBLICATIONS

"The Performance Enhancement of Multibeam Adaptive Base–Station Antennas for Cellular Land Mobile Radio Systems", S. Swales et al, *IEEE Transactions on Vehicular Technology*, vol. 39, No. 1, Feb. 1990, pp. 56–67.

"Capacity Improvement with Base–Station Antenna Arrays in Cellular CDMA", A. Naguib et al, *IEEE Transactions on Vehicular Technology*, vol. 43, No. 3, Aug. 1994, pp. 691–698.

"Joint Detection with Coherent Receiver Antenna Diversity in CDMA Mobile Radio Systems", P. Jung et al, *IEEE Transactions on Vehicular Technology*, vol. 44, No. 1, Feb. 1995, pp. 76–88.

*Primary Examiner*—Benedict V. Safourek
*Attorney, Agent, or Firm*—Ware, Fressola, Van Der Sluys & Adolphson LLP

[57] ABSTRACT

To assign a carrier frequency to different mobile stations in a conventional Space Division Multiple Access (SDMA) radio system, the stations are differentiated according to the direction in space from which they transmit radio signals to a base station. In addition, the distances between the base station and the mobile stations are compared. To prevent interference at the receiving site (base station BTS), according to the invention a carrier frequency (f) is assigned to the different mobile stations (MS1 to MS3) only if the directions in space ($\Theta 1$ to $\Theta 3$) are sufficiently different and the receive levels (P1 to P3) of the radio signals are sufficiently equal. To that end, each mobile station (MS1 to MS3) is assigned a guard area, which encompasses at least a preselected solid angle (lobe width w) and at most a preselected level space (dynamic range S). Any further mobile station wanting a radio link with the base station on the same carrier frequency (f) must be located in a permissible zone (Z) between the guard areas, which comprises a level range (zP) that is common to all preceding mobile stations. A further guard area is defined with each further connection, and the permissible zone (Z) is determined anew. The full capacity of the carrier frequency (f) is only attained when the permissible zone (Z) becomes so small that it no longer comprises sufficient space for the solid angle (w).

19 Claims, 5 Drawing Sheets

ASSIGNMENT OF A CARRIER FREQUENCY IN AN SDMA RADIO SYSTEM

TECHNICAL FIELD

The invention concerns a method for assigning a carrier frequency in a Space Division Multiple Access (SDMA) radio system, a control device with a processor-controlled circuit for carrying out the method, and a base station for the SDMA radio system, which contains such a processor-controlled circuit.

BACKGROUND OF THE INVENTION

Such a method and such devices are known from WO 93/12590. It describes an SDMA radio system, in which a base station simultaneously receives radio signals from different directions in space coming from remote radio stations (mobile stations 20, 22 and 24 in FIG. 4) on a carrier frequency. It further describes that the base station transmits directional radio signals to the remote radio stations on another carrier frequency. Thus, radio signals are transmitted in both the upward and in the downward direction in accordance with the SDMA principle, which can result in the reutilization of preselected carrier frequencies. To assign these carrier frequencies to the remote radio stations for sending or receiving, the remote radio stations are differentiated according to their directions in space, which are calculated by a control device that is integrated into the base station and is called an SDMA processor SDMAP (see page 5, last paragraph and page 4, second paragraph). Furthermore, the distances between the base station and the remote stations are determined by measuring the transit time of the radio signals for a new assignment of the carrier frequencies (see page 23, "SDMA Controller" section).

Although the problem of interference between the radio signals is addressed in WO 93/12590, the measures described therein are hardly suitable for solving the problem taking place in the base station especially during reception of the radio signals, in the simplest possible manner. At the least, the transit time measurements required to determine the distances are expensive and are only possible with already established duplex radio links. Furthermore, this measure is very sensitive to disturbances from multipath reception, which can frequently occur during mobile radio transmissions.

DISCLOSURE OF INVENTION

It is the task of the invention to solve this problem in a simpler and more complete manner, by providing a method for assigning a carrier frequency in an SDMA radio system, and by providing devices for carrying out the method.

According to a first aspect of the present invention, a carrier frequency is assigned in a space division multiple access radio system comprising a base station for receiving radio signals from different directions in space from corresponding different remote stations simultaneously on the carrier frequency by means of a directional antenna array in a method that is characterized in that the carrier frequency is assigned to the remote stations only if the different directions in space differ at least by a preselected solid angle and if the radio signals are received at the base station at receive signal levels which are within a preselected signal level range.

According to a second aspect of the present invention, a control device for a base station in a space division multiple access radio system for simultaneously receiving radio signals from different directions in space coming from remote radio stations on a carrier frequency by means of a signal processor which is connected to a radio subassembly in the base station for evaluating the radio signals received from the remote radio stations to determine the different directions in space, is characterized in that the signal processor is for evaluating the radio signal received from the remote radio stations to determine their receive signal levels and, for controlling a signal for assigning the carrier frequency to the remote stations only if the different directions in space differ at least by a preselected solid angle and if the receive signal levels of the radio signals are within a preselected signal level range.

According to a third aspect of the present invention, a base station for a space division multiple access radio station comprises a radio subassembly and a directional antenna array connected thereto for simultaneously receiving radio signals from different directions in space and coming from remote radio stations on a carrier frequency, and which further comprises a signal processor connected to the radio subassembly for evaluating the radio signals received from the remote radio stations for determining the different directions in space, is characterized in that the signal processor is for evaluating the radio signals received from the remote radio stations for determining their receive signal levels, and by controlling a signal to the remote radio stations, for only assigning the carrier frequency to them if the directions in space differ by at least a preselected solid angle and if the receive signal levels of the radio signals are within a preselected signal range.

Accordingly, a control device which controls the base station assigns a carrier frequency to the remote radio stations only if these emit radio signals from directions in space that differ from each other by at least one preselectable solid angle, and if the radio signals produce receive levels at the base station that are within a preselected level range. In this way, the assignment of a carrier frequency that can be used for the downward radio connection takes place with parameters that are enabled at any time by evaluating the radio signals received at the base station. In general, the directions in space as well as the receive levels as such have already been determined for the SDMA radio transmission, so that a simple comparison of these determined parameters with the preselected solid angle or the preselected receive level makes the solution of the invention achievable at a low cost.

These and other objects, features and advantages of the present invention will become more apparent in light of the detailed description of a best mode embodiment thereof, as illustrated in the accompanying drawing.

BRIEF DESCRIPTION OF THE DRAWINGS

FIG. 1b depicts a reception diagram of the base station that supplies the radio cell of FIG. 1a.

FIG. 2b depicts a reception diagram of the base station that supplies the radio cell of FIG. 2a.

FIG. 3b depicts a reception diagram for the example of FIG. 3a.

BEST MODE FOR CARRYING OUT THE INVENTION

The configuration examples that are described in what follows refer to SDMA mobile radio systems equipped in accordance with the invention. The remote radio stations are therefore called mobile stations in the following. The configurations describe the invention very clearly and can be used for further applications of the invention, even outside of mobile radio systems.

Figure 1A:
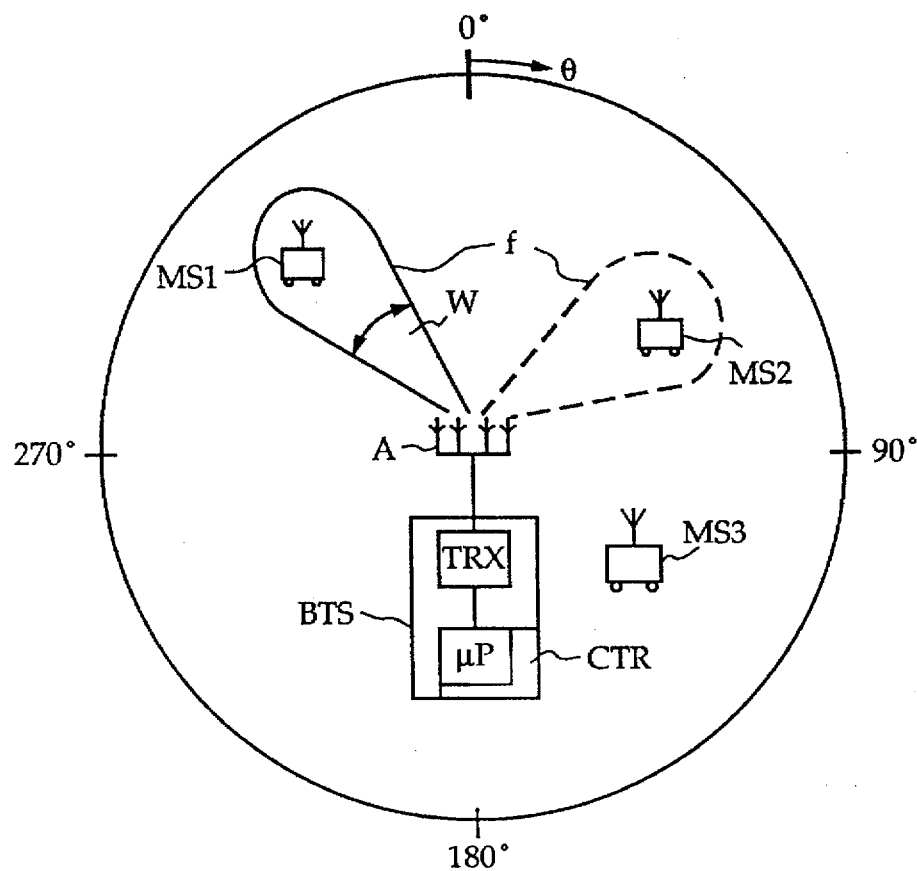
FIG. 1a depicts a single radio cell of an SDMA mobile radio system, including a base station and remote stations.

The radio cell depicted in FIG. 1a is centrally supplied from a base station BTS. To that effect, the base station BTS contains an antenna array A, which is a phase-controlled group antenna, and a radio subassembly TRX connected thereto, which is configured as an SDMA radio transmitter-receiver. These components are used for the SDMA radio transmission between the base station BTS and the mobile stations MS1, MS2, MS3 located within the radio cell. An SDMA radio transmitter-receiver as such is described e.g. in the article "The Performance Enhancement of Multibeam Adaptive Base-Station Antennas for Cellular Land Mobile Radio Systems" by Simon C. Swales et al., from IEEE Transactions on Vehicular Technology, pages 56–67, Vol. 39, No. 1, February 1990.

Furthermore, the base station BTS contains a control device CTR with a processor-controlled circuit μP, which is connected to the SDMA radio transmitter-receiver TRX, and executes the method of the invention in order to control the SDMA radio transmission in such a way, that only those mobile stations MS1, MS2, MS3 whose radio signals are received at the base station BTS from sufficiently different directions in space and at sufficiently equal receive signal strength levels, are switched to the same carrier frequency f.

Figure 1B:
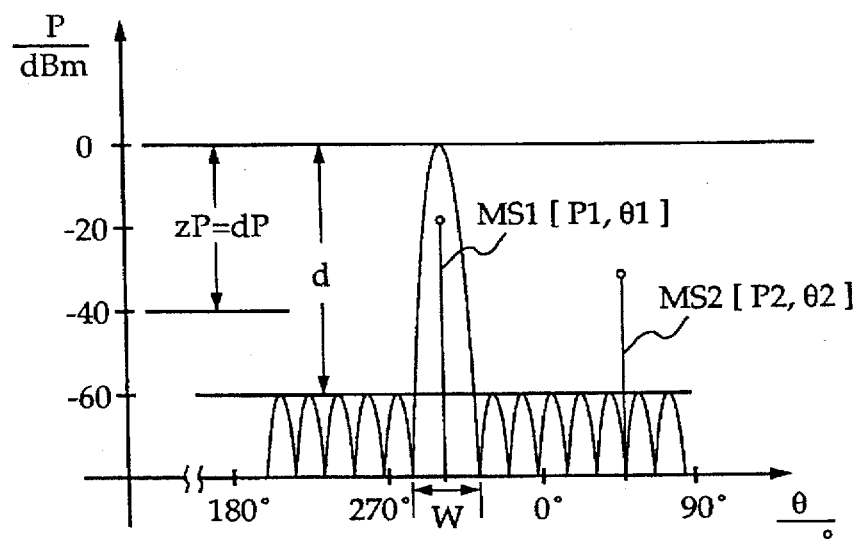

FIG. 1b represents a receiving diagram of the base station BTS, wherein the radio signal of the first mobile station MS1 is received from a first direction in space $\Theta1=325°$, at a first receive level P1=−20 dBm, within a first directional lobe shown by a solid line in FIG. 1a. The radio signal of the second mobile station MS2 is received from a second direction in space $\Theta2=60°$ at a second receive level P2=−30 dBm within a second directional lobe shown by a broken line in FIG. 1a. Accordingly, the two directions in space $\Theta1$ and $\Theta2$ differ from each other by $|\Theta1-\Theta2|=95°$. The two receive levels P1 and P2 differ by $|P1-P2|=10$ dB.

To test whether the two mobile stations MS1 and MS2 can simultaneously transmit on the one carrier frequency f, the invention preselects a solid angle w and a level range zP, which indicate the minimum difference of the directions in space and the maximum difference of the receive levels. In this case the solid angle w was preselected to equal the directional lobe width of the antenna array at w=30°. The level range zP was adapted to the dynamic range dP=40 dB which is present in the SDMA radio transmitter-receiver TRX. The level range zP is preselected so that it neither exceeds the dynamic range dP of the receiver part in the SDMA radio transmitter-receiver, nor the side-lobe attenuation d that is provided by the antenna array (d=60 dB in this case). Other criteria may also be used to preselect the level range zP, such as perhaps a required signal-to-noise ratio or a required fading reserve.

Figure 2A:
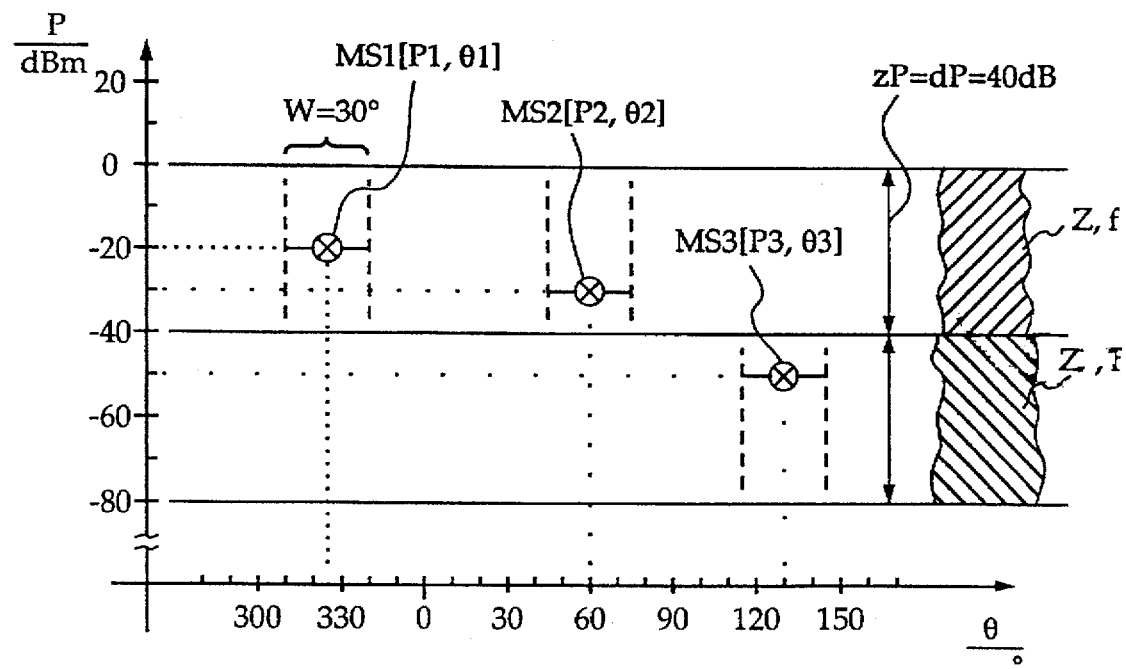
FIG. 2a depicts a first example of an assignment of carrier frequencies within the radio cell.
Figure 2B:
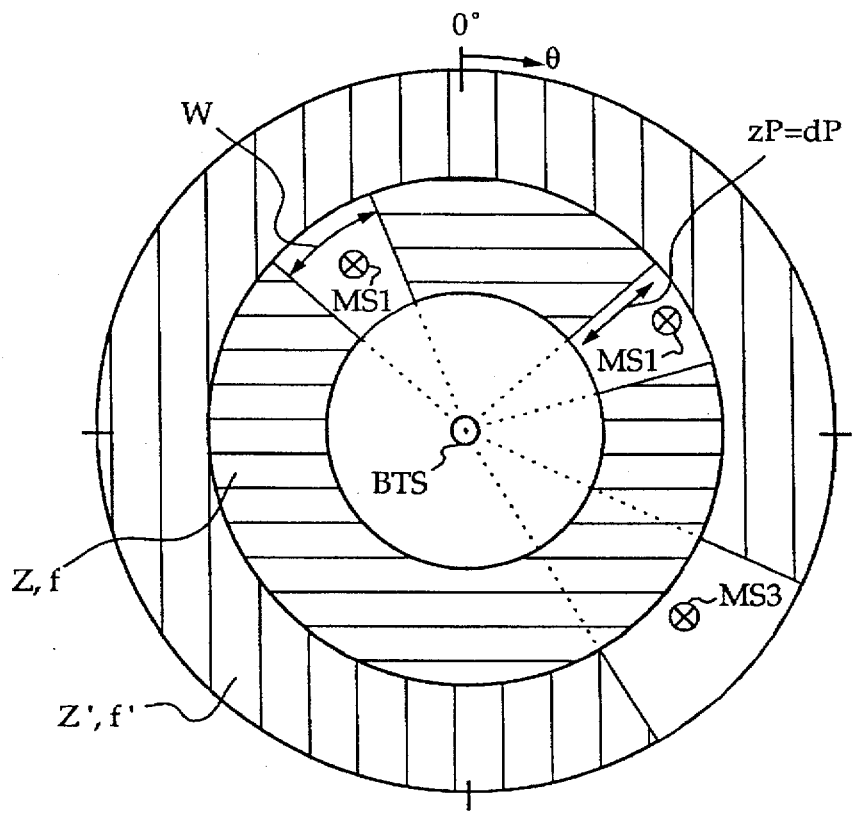

As a first configuration example, FIGS. 2a and 2b illustrate an assignment of two carrier frequencies f and f', which are used for the SDMA radio transmission within two fixed preselected level ranges zP. The illustration in FIGS. 2a and 2b refers to the radio cell depicted in FIGS. 1a and 1b.

As illustrated in FIG. 2a, the level range of the first carrier frequency f lies between 0 dBm and −40 dBm, and the level range of the second carrier frequency f' between −40 dBm and −80 dBm. Accordingly, the receive levels P1, P2 and P3 produced by the mobile stations on the respective carrier frequency may only fluctuate a maximum of 40 dB. The assignment of the carrier frequencies f and f' takes place when the link is established, i.e. by evaluating the signals that are emitted at the start of a radio link by a mobile station (e.g. MS3) to the base station BTS on a carrier frequency preselected for the signalization (channel). In addition, the assignment of the carrier frequencies is constantly checked by monitoring the receive levels and the directions in space. If the criteria preselected by the level range zP and the solid angle w are no longer fulfilled, a new assignment of the carrier frequencies is performed.

The signals produced in the individual antenna elements of the antenna array A are evaluated by means of the so-called ESPRIT algorithm, to determine the different directions in space $\Theta1$, $\Theta2$, $\Theta3$ from which the mobile stations MS1, MS2 or MS3 are transmitting. Furthermore, the amplitudes of the antenna signals are evaluated to determine the receive levels P1, P2, P3. After each pair of values has been determined, they are checked to determine whether the values $\Theta$ and P are within a permissible range (zone Z or Z'). In this way e.g. the pair of values [$\Theta3$, P3], which identifies mobile station MS3, is checked to see whether $\Theta3$ differs by at least w=30° from the already determined directions in space $\Theta1$ and $\Theta2$, and whether P3 lies within one of the two level ranges zP. This determines the particular carrier frequency that is assigned to the mobile station (in this case the assignment of f' to MS3). As illustrated in FIGS. 2a and 2b, the evaluation of the above criteria makes an efficient carrier frequency coverage possible. It is pointed out that the permissible zones Z and Z' illustrated in FIG. 2b do not correspond to any partial geographical areas of the radio cell. These zones are rather a clear depiction of a distribution in space of the level ranges zP from 0 to −40 dBm or from −40 dBm to −80 dBm shown in FIG. 2a. The fixed preselection of the level ranges zP permits the use of simple radio receivers, which are optimally tuned to their level range. However, the utilization of the capacity of the existing carrier frequencies can be increased with additional measures of the invention, as is made clear in the following description of FIGS. 3 to 5.

Figure 3A:
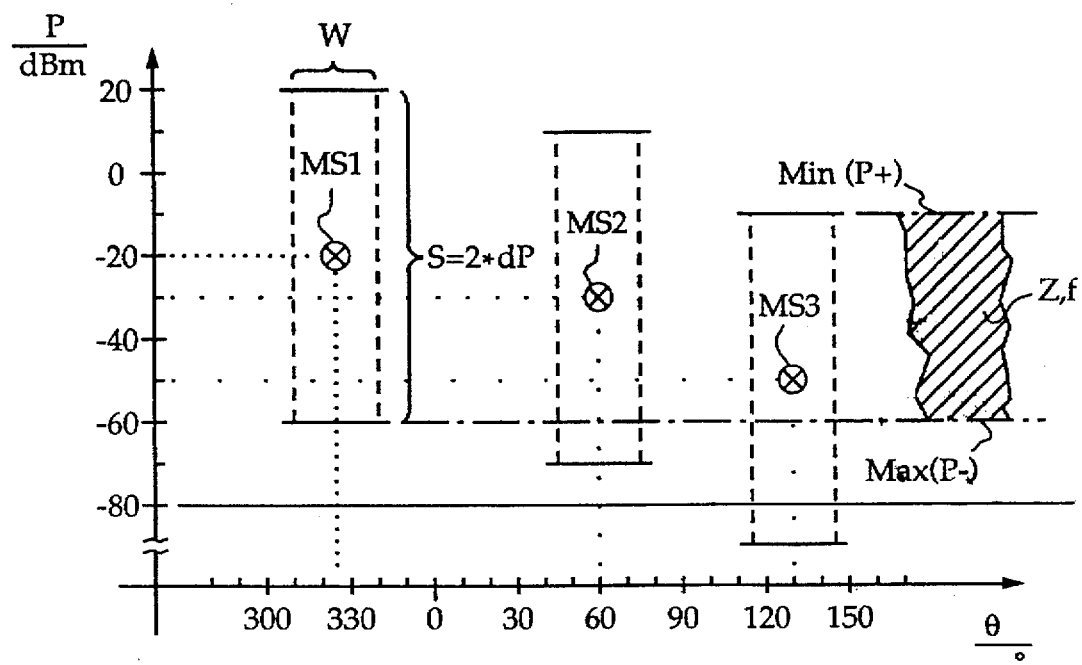
FIG. 3a depicts a second example of an assignment of carrier frequencies.
Figure 3B:
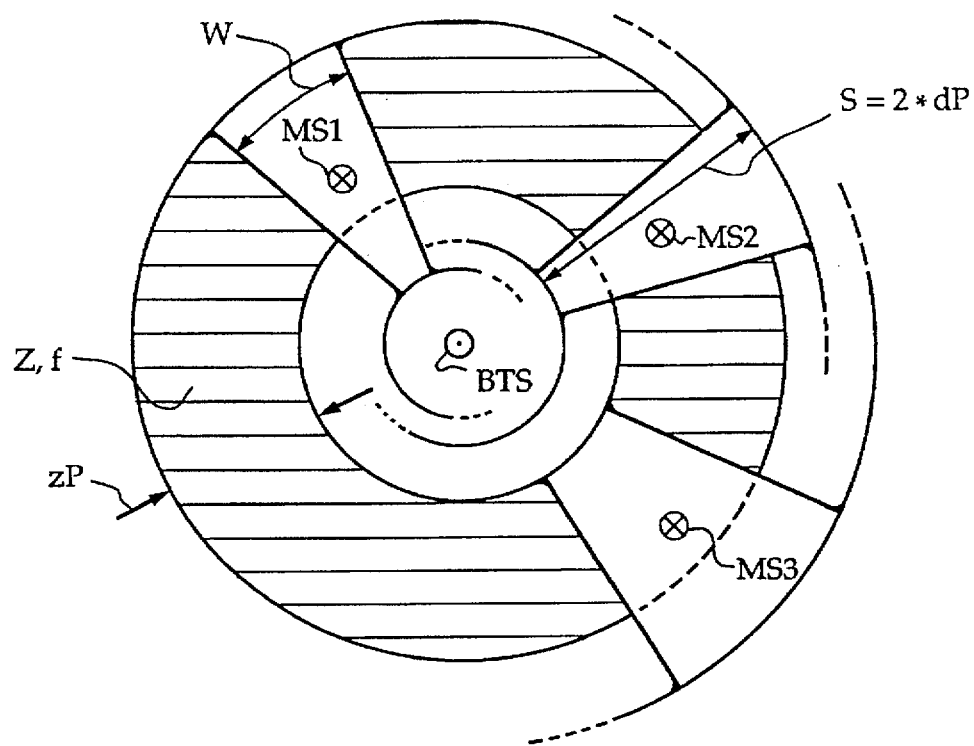
Figure 4:
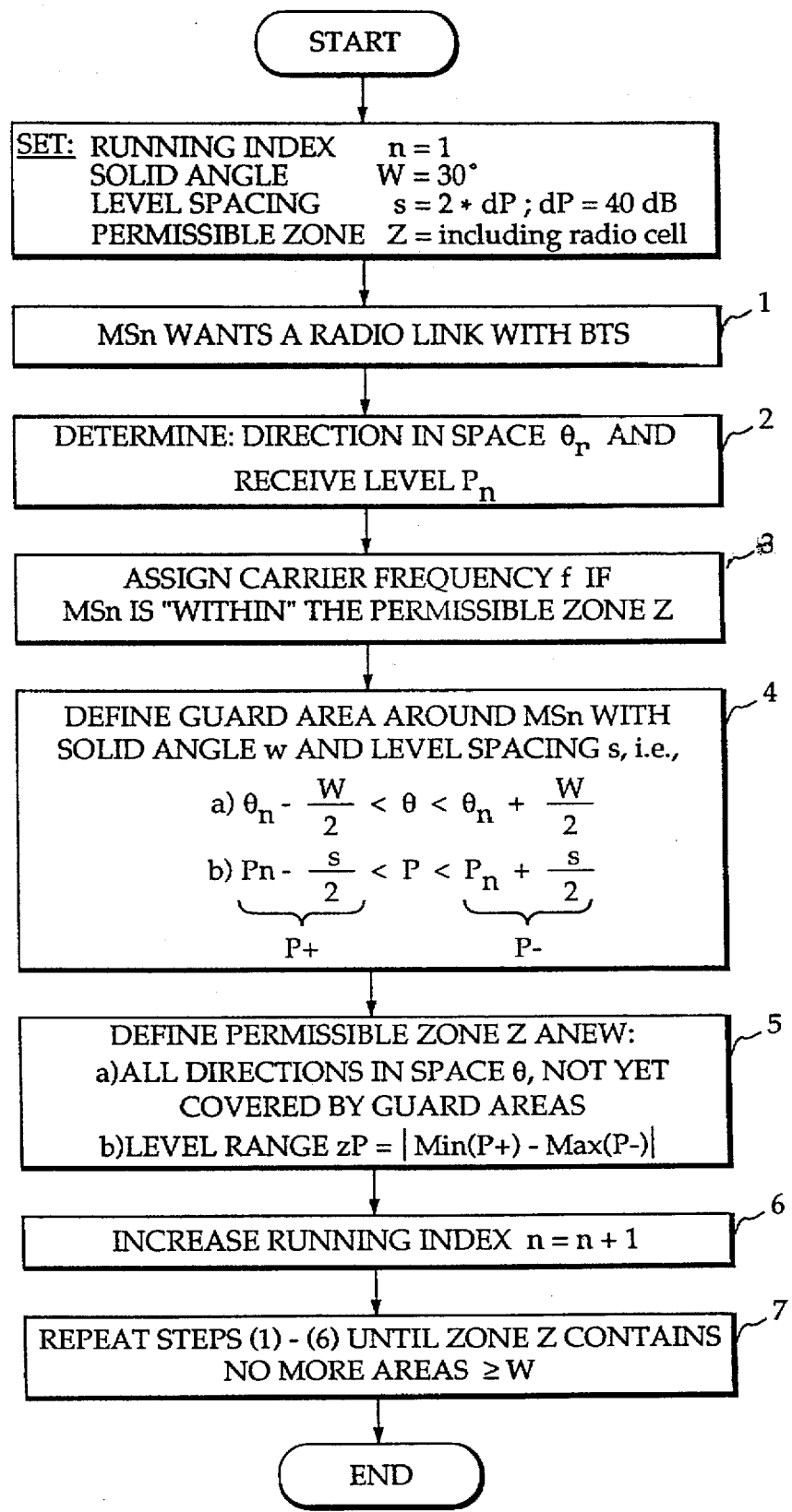
FIG. 4 depicts a flow diagram of a method for assigning the carrier frequencies according to the second example in FIG. 3.

FIGS. 3a and 3b illustrate a second configuration example for the assignment of a carrier frequency f within the radio cell illustrated in FIG. 1a. FIG. 3a depicts a distribution in space of the receive levels produced at the base station site by the mobile stations MS1 to MS3. The indications in FIG. 3a correspond to those of FIG. 2a. The partition of the radio cell into permissible and prohibited areas is shown in FIG. 3b (compare to FIG. 2b). This partition of the radio cell is achieved with the schematically illustrated method of FIG. 4, which is described in the following:

At the start of the method, which is performed by the control device, decision criteria are defined for the assignment of the carrier frequency f. Here the solid angle w=30° is selected, so that it corresponds to the directional beam width of the antenna array. A level spacing S is defined for the level range zP to be preselected later, which corresponds to twice the dynamic range 2·dP=80 dB of the radio receiver. The method is iterative, i.e. with the establishment of each link the permissible zone Z is determined anew, whereby the assignment of the carrier frequency f is checked during subsequent link establishment.

To that end, a running index n is set to n=1 at the start of the method. Since no mobile station is as yet communicating with the base station, the permissible zone Z corresponds to the entire radio cell.

Steps 1) to 3):

As soon as a first mobile station MS1 signals that it wants a radio link, the base station BTS' evaluates the signals to determine the direction in space $\Theta n=\Theta 1$ and the receive level Pn=P1. Next, the assignment of the carrier frequency f takes place if the mobile station MSn=MS1 displays parameters $\Theta 1$ and P1 which fall into the permissible zone Z. The above criterion is fulfilled since, at the start of the method, zone Z comprises the entire level range of the radio cell (from 20 dBm to −100 dBm).

Steps 4) to 7):

After that, a guard area is defined for the mobile station MS1, which corresponds to a zone that is prohibited for other mobile stations (interference zone). This guard area comprises an angle segment with the solid angle w=30° and the level spacing S=80 dB, as illustrated in FIG. 3b. Next, the permissible zone Z is defined anew, so that it comprises all solid angles $\Theta$ that lie outside of the guard area, and comprises all receive levels P that lie inside of the level spacing S. The permissible zone Z corresponds to a level range zP that is distributed in the direction in space $\Theta$ in which the receive level P2 of a second mobile station MS2 must lie, so that it too can be switched to the carrier frequency f (compare FIGS. 3a and b). Steps 1) to 6) are repeated after the running index n has been increased to n=2.

As soon as the second mobile station MS2 wants a radio link with the base station BTS, the direction in space $\Theta 2$ and the receive level P2 are determined as described above, and a guard area is defined around this mobile station MS2 (repetition of steps 1 to 4).

Since at least two guard areas have already been defined, the permissible zone Z is now restricted to those areas that on the one hand have not yet been covered by the guard areas, and on the other are in a level range zP that corresponds to the overlap area of the level ranges S, which are common to all guard areas. In this way the level range zP is calculated from the distance between the smallest upper level limit Min (P+)=Min (P1+s/2; P2+s/2) and the largest lower level limit Max (P−)=Min (P1−s/2; P2−s/2). This level range zP, and thereby the new permissible zone Z as well, are valid for a further mobile station MS3 wanting a radio link.

Steps 1) to 6) of the method are performed for each newly added mobile station. This allows the carrier frequency f to be assigned within a changing zone Z, so that as many mobile stations as possible make use of this carrier frequency f without producing interference at the receiving site (base station BTS). The permissible zone Z is thereby adapted to the distribution of receive levels P1, P2 etc. This avoids a fixed separation as in FIGS. 2a and 2b. The method is concluded if the permissible zone Z no longer contains areas extending at least over the preselected solid angle w. At the end of the method, the carrier frequency is fully occupied, i.e. the frequency and space resources are used to capacity.

In order to switch even more mobile stations, i.e. more radio channels, to the carrier frequency f, multiple radio transmissions in TDMA (Time Division Multiple Access) or CDMA (Code Division Multiple Access) can be envisioned.

According to the above described method, the assignment of the carrier frequency f is then performed for each TDMA and/or CDMA radio channel.

Figure 5:
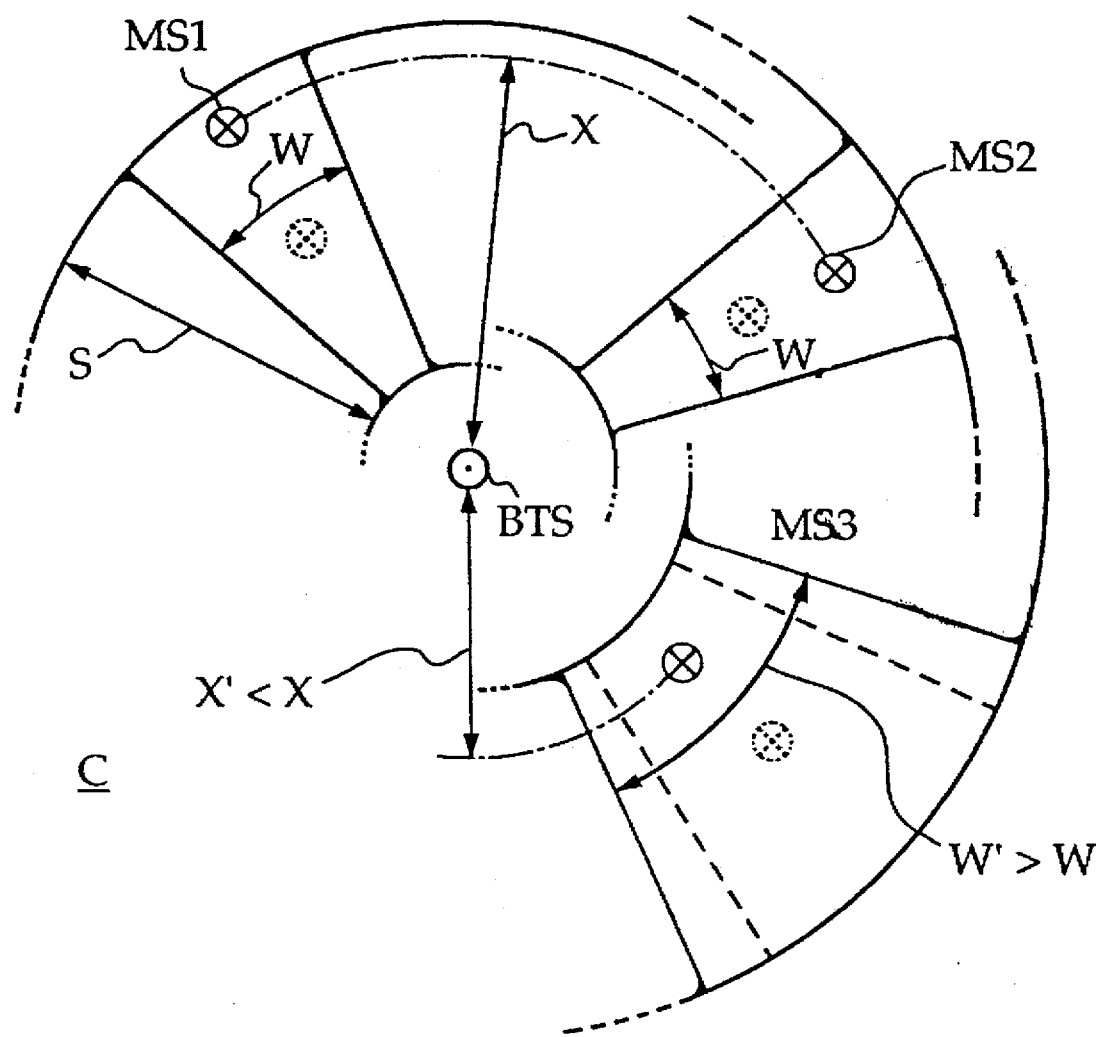
FIG. 5 depicts a variation of the second example, which is particularly advantageous for use with multipath reception.

FIG. 5 now describes a variation of the second configuration example, which is especially suitable for assigning carrier frequencies to multipath transmission.

Interference due to multipath transmission occurs particularly strongly in mobile radio systems and leads to problems such as multipath fading and inter-symbol interference. Furthermore, the known measurements of the radio signals' transit time for the assignment of carrier frequencies during multipath reception are very inaccurate, and cannot be used in cases of total shading.

According to the invention, these problems have already been essentially overcome by the described evaluation of the receive levels. Beyond that, the already described guard areas are expanded to further prevent the multipath signals of a mobile station from being beamed to the receiving lobe of a closely adjacent mobile station.

As depicted in FIG. 5, the solid angle w' of a guard area increases with a reduction in the distance X' of the mobile station MS3 from the base station BTS. This is based on the knowledge that as the distance X' decreases, the multipath signals can enter the adjacent receiving lobes at a steeper angle. Accordingly, this measure provides for sufficient distance between the individual mobile stations MS1, MS2 and MS3 in the particularly critical post-reception area (core zone of the radio cell).

FIG. 5 illustrates the locations of the mobile station. The markings in FIGS. 2b and 3b that correspond to the receive levels are represented in this instance by broken lines. This is to make clear that two mobile stations (MS1 and MS2), which are at the same distance X from the base station BTS, can produce different receive levels (P1>P2).

A measurement of the radio signals' transit time is proposed to also determine the distances X and X', in addition to the evaluation of the receive levels in accordance with the invention. The measurement is preferably performed with a sufficient receive level, which assumes an undisturbed line-of-sight radio link.

The above described methods are performed by a control device, which is connected to the radio assembly and is integrated into the base station BTS (compare to CTR in FIG. 1a). In essence, this control device contains a microprocessor circuit to perform control programs according to the method. The digital signal processor "TMS 320 C40" from Texas Instruments is suitable for constructing such a microprocessor circuit. Several base stations by means of such a control device can be carried out. To that effect, the control device should be arranged in the SDMA radio system like a so-called base station controller in a conventional mobile radio system.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of assigning a carrier frequency (f) in a space division multiple access (SDMA) radio system comprising a base station (BTS) for receiving radio signals from different directions in space ($\Theta 1$, $\Theta 2$, $\Theta 3$) from corresponding different remote stations (MS1, MS2, MS3) simultaneously on said carrier frequency (f) by means of a directional antenna array (A), characterized in that said carrier frequency (f) is assigned to the remote stations (MS1, MS2, MS3) only if the different directions in space ($\Theta 1$, $\Theta 2$, $\Theta 3$) differ at least by a solid angle (w) and if the radio signals are received at the base station (BTS) at receive signal levels which are within a signal level range (zP).

2. A method as claimed in claim 1, characterized in that the solid angle (w) is selected so that a beam width (w) of the directional antenna array (A) is taken into account.

3. A method as claimed in claim 1, characterized in that the solid angle is a variable solid angle (w') which is increased with decreasing distance (X') between the base station (BTS) and the remote stations (MS1, MS2, MS3).

4. A method as claimed in claim 1, characterized in that the signal level range (zP) is selected so as to be adapted to a dynamic range (dP) of a radio subassembly (TRX) which receives the radio signals within the base station (BTS).

5. A method as claimed in claim 4, characterized in that the signal level range is reduced by an amount corresponding to a required signal-to-noise ratio and/or to a required fading reserve.

6. A method as claimed in claim 4, characterized in that the signal level range (zP) is selected so as to be adapted to a side-lobe attenuation (d) provided by the antenna array (A) of the base station (BTS).

7. A method as claimed in claim 1, characterized in that the signal level range (zP) is selected so as to be adapted to a side-lobe attenuation (d) provided by the antenna array (A) of the base station (BTS).

8. A method as claimed in claim 7, characterized in that the preselected signal level range is reduced by an amount corresponding to a required signal-to-noise ratio and/or to a required fading reserve.

9. A method as claimed in claim 1, characterized in that the signal level range (zP) is selected anew step by step by being determined, during each establishment of a connection between the base station (BTS) and one of the remote stations (MS3), by means of an overlap of tolerance bands defined around the receive signal levels (P1, P2, P3).

10. A method as claimed in claim 9, characterized in that the tolerance bands define a level spacing adapted to twice a dynamic range (dP) of a radio subassembly (TRX) which receives the radio signals within the base station (BTS).

11. A method as claimed in claim 10, characterized in that the tolerance bands define a receive signal level spacing adapted to a side-lobe attenuation (d) provided by the antenna array (A) of the base station (BTS).

12. A method as claimed in claim 9, characterized in that the tolerance bands define a receive signal level spacing adapted to a side-lobe attenuation (d) provided by the antenna array (A) of the base station (BTS).

13. A method as claimed in claim 1, characterized in that the method is also carried out to assign another carrier frequency on which the base station (BTS) transmits radio signals to the remote stations (MS1, MS2, MS3).

14. A method as claimed in claim 13, characterized in that the method is carried out to assign TDMA and/or CDMA radio channels.

15. A method as claimed in claim 1, characterized in that the method is carried out to assign TDMA and/or CDMA radio channels.

16. A control device (CTR) for a base station (BTS) in a space division multiple access (SDMA) radio system for simultaneously receiving radio signals from different directions in space ($\theta 1, \theta 2, \theta 3$) coming from remote radio stations (MS1, MS2, MS3) on a carrier frequency (f) by means of a signal processor ($\mu P$) which is connected to a radio subassembly (TRX) in the base station (BTS) for evaluating the radio signals received from the remote radio stations to determine the different directions in space ($\theta 1, \theta 2, \theta 3$), characterized in that the signal processor ($\mu P$) is for evaluating the radio signals received from the remote radio stations to determine their receive signal levels (P1, P2, P3) and, by controlling a signal for assigning the carrier frequency (f) to the remote stations (MS1, MS2, MS3) only if the different directions in space ($\theta 1, \theta 2, \theta 3$) differ at least by a solid angle (w), and if the receive signal levels (P1, P2, P3) of the radio signals are within a signal level range (zP).

17. A control device (CRT) as claimed in claim 16, characterized in that the control device is for a base station (BTS) in a TDMA and/or CDMA radio system.

18. A base station (BTS) for a space division multiple access (SDMA) radio station, comprising a radio subassembly (TRX) and a directional antenna array (A) connected thereto for simultaneously receiving radio signals from different directions in space ($\theta 1, \theta 2, \theta 3$), coming from remote radio stations (MS1, MS2, MS3) on a carrier frequency (f), and which further comprises a signal processor ($\mu P$) connected to the radio subassembly (TRX) for evaluating the radio signals received from the remote radio stations for determining the different directions in space ($\theta 1, \theta 2, \theta 3$), characterized in that the signal processor ($\mu P$) is for evaluating the radio signals received from the remote radio stations for determining their receive signal levels (P1, P2, P3), and by controlling a signal to the remote radio stations (MS1, MS2, MS3), for only assigning the carrier frequency (f) to them if the directions in space ($\theta 1, \theta 2, \theta 3$) differ by at least a solid angle (w), and if the receive signal levels (P1, P2, P3) of the radio signals are within a signal level range (zP).

19. A base station (BTS) as claimed in claim 18, characterized in that the base station (BTS) is for a TDMA and/or CDMA radio station.

* * * * *